US008723974B2

(12) United States Patent
Suzuki (10) Patent No.: US 8,723,974 B2
(45) Date of Patent: May 13, 2014

(54) IMAGE PICKUP APPARATUS, IMAGE PICKUP METHOD AND RECORDING DEVICE RECORDING IMAGE PROCESSING PROGRAM

(75) Inventor: Daisuke Suzuki, Sagamihara (JP)

(73) Assignee: Olympus Corporation, Tokyo (JP)

( * ) Notice: Subject to any disclaimer, the term of this patent is extended or adjusted under 35 U.S.C. 154(b) by 134 days.

(21) Appl. No.: 13/438,074

(22) Filed: Apr. 3, 2012

(65) Prior Publication Data

US 2012/0257077 A1  Oct. 11, 2012

(30) Foreign Application Priority Data

Apr. 7, 2011  (JP) ................................. 2011-085238

(51) Int. Cl.
*H04N 5/225* (2006.01)
*H04N 5/235* (2006.01)
*H04N 5/262* (2006.01)

(52) U.S. Cl.
USPC ...................... 348/218.1; 348/239; 348/229.1

(58) Field of Classification Search
CPC ... H04N 5/235; H04N 5/23238; H04N 5/272; H04N 9/045
USPC ............. 348/218.1, 222.1, 221.1, 229.1, 362, 348/239
See application file for complete search history.

(56) References Cited

U.S. PATENT DOCUMENTS

| 8,150,201 | B2* | 4/2012 | Kasai et al. .................... 382/274 |
| 8,488,016 | B2* | 7/2013 | Nagataki et al. ........... 348/222.1 |
| 8,587,692 | B2* | 11/2013 | Lee et al. .................... 348/229.1 |
| 8,599,282 | B2* | 12/2013 | Imai et al. ................... 348/229.1 |
| 8,606,009 | B2* | 12/2013 | Sun ............................... 382/169 |
| 2011/0149129 | A1* | 6/2011 | Kim et al. ..................... 348/296 |
| 2011/0188744 | A1* | 8/2011 | Sun ............................... 382/162 |
| 2011/0242368 | A1* | 10/2011 | Haneda et al. ............... 348/239 |
| 2012/0105681 | A1* | 5/2012 | Morales ........................ 348/239 |
| 2012/0127348 | A1* | 5/2012 | Li .................................. 348/239 |
| 2012/0218442 | A1* | 8/2012 | Jandhyala et al. ........... 348/239 |

FOREIGN PATENT DOCUMENTS

| JP | 07-075026 A | 3/1995 |
| JP | 2002-135648 A | 5/2002 |
| JP | 2009-284136 A | 12/2009 |

* cited by examiner

*Primary Examiner* — Roberto Velez
*Assistant Examiner* — Pritham Prabhakher
(74) *Attorney, Agent, or Firm* — Holtz, Holtz, Goodman & Chick, PC (57) ABSTRACT

A digital camera has an image pickup unit which can obtain a set of plural input images with different exposure amounts by photographing the same subject; an image synthesizing unit which creates a synthesized image from the set of plural input images; a live-view image output unit which outputs a live-view image on the basis of the synthesized image obtained by synthesizing a set of n pieces of (n is an integer not less than 2) input images with different exposure amounts obtained from the photographing unit during a view display operation; and a recorded image creating unit which creates an image for recording on the basis of the synthesized image obtained by synthesizing a set of m pieces of (m is an integer not less than 2) input images with different exposure amounts obtained from the image pickup unit during main photographing in the image synthesizing unit.

14 Claims, 7 Drawing Sheets

IMAGE PICKUP APPARATUS, IMAGE PICKUP METHOD AND RECORDING DEVICE RECORDING IMAGE PROCESSING PROGRAM

FIELD OF THE INVENTION

The present invention relates to a technology for obtaining an image with improved gradation by synthesizing image data with different exposure amounts for a plurality of frames obtained by photographing the same subject.

BACKGROUND OF THE INVENTION

Under a sunny outdoor backlight photographing condition or the like, a range of a subject brightness in a photographed scene (hereinafter referred to merely as a "brightness range") becomes wider. When a subject with a wider brightness range is photographed by a digital camera, the brightness range might not be contained in a dynamic range recordable in an image pickup system and an image signal processing system. In that case, in a dark section in the image, so-called blocked-up shadows occur, that is, the image is underexposed. In a bright section in the image, on the contrary, blown-out highlights occur, that is, the image is overexposed.

Technologies for solving such phenomena include a High Dynamic Range Imaging technology (hereinafter referred to as HDR technology). In the HDR technology, the same photographed scene is photographed plural times while a shutter speed is changed every time, and a plurality of images with exposure amounts different from each other (hereinafter referred to as differently exposed image) are obtained. A pixel value of image data obtained with a larger exposure amount is used for a region where blocked-up shadows might occur in the image, while a pixel value of the image data with smaller exposure amount is used for a region where blown-out highlights might occur, and synthesis processing is performed. As a result, an image in which gradation from a dark section to a bright section in the image is reproduced can be obtained.

In JP07-75026, an exposure amount to an image pickup element is changed in different n stages (n is an integer not less than 2), and an article is photographed. Image data in n sets are photographed with each exposure amount in n stages and obtained from the image pickup element. Two image data obtained with adjacent exposure amounts are synthesized and become a synthesized image having an expanded dynamic range. The similar procedure is repeated for the remaining (n−1) sets of image data, and one image data is obtained in the end.

In JP2002-135648, photographing sessions are performed with a plurality of different exposure conditions before main photographing, information relating to the dynamic range of the photographed scene is obtained, and the exposure condition for the plural sessions of exposure in the main photographing is determined.

In JP2009-284136, an electronic camera capable of operating in a live-view mode determines a first exposure amount suitable for image pickup of a first region and a second exposure amount suitable for image pickup of a second region other than the first region if there is a first region exceeding the dynamic range of an imaging section in the live-view image. When a release button is pressed, the electronic camera takes a first image with the first exposure amount and a second image with the second exposure amount, respectively, reads out the second image by partial reading and synthesizes the first image and the second image.

SUMMARY OF THE INVENTION

A representative example of the present invention is as follows. That is, an image pickup apparatus includes an image pickup unit configured capable of obtaining a set of plural input images with different exposure amounts by photographing the same subject, an image synthesizing unit which creates a synthesized image from the set of plural input images with the different exposure amounts, a live-view image output unit which outputs a live-view image on the basis of the synthesized image created by synthesizing a set of n (n is an integer not less than 2) input images with different exposure amounts obtained from the image pickup unit in the image synthesizing unit during a live-view display operation, and a recorded image creating unit which creates an image for recording on the basis of the synthesized image created by synthesizing a set of m (m is an integer not less than 2) input images with different exposure amounts obtained from the image pickup unit in the image synthesizing unit during main photographing.

Another representative example of the present invention is as follows. That is, an image pickup method includes steps of obtaining a set of plural input images with different exposure amounts by photographing the same subject, of creating a synthesized image from the set of plural input images with different exposure amounts, of outputting a live-view image on the basis of the synthesized image created by synthesizing a set of n (n is an integer not less than 2) input images with different exposure amounts obtained by photographing during a live-view display operation, and of creating an image for recording on the basis of the synthesized image created by synthesizing a set of m (m is an integer not less than 2) input images with different exposure amounts obtained by photographing during main photographing.

Still another representative example of the present invention is as follows. That is, a computer readable recording device includes an image processing program encoded and recorded in a computer readable format. The image processing program causes a computer to execute a method comprising a step of creating a synthesized image from a set of the plural input images with different exposure amounts, a step of outputting a live-view image on the basis of the synthesized image created by synthesizing a set of n (n is an integer not less than 2) input images with different exposure amounts obtained by photographing during live-view display operation, and a step of creating an image for recording on the basis of the synthesized image created by synthesizing a set of m (m is an integer not less than 2) input images with different exposure amounts obtained by photographing during main photographing.

DESCRIPTION OF THE PREFERRED EMBODIMENTS

First and second embodiments will be described below regarding a digital camera capable of displaying a live-view image.

—First Embodiment—

Figure 1A:
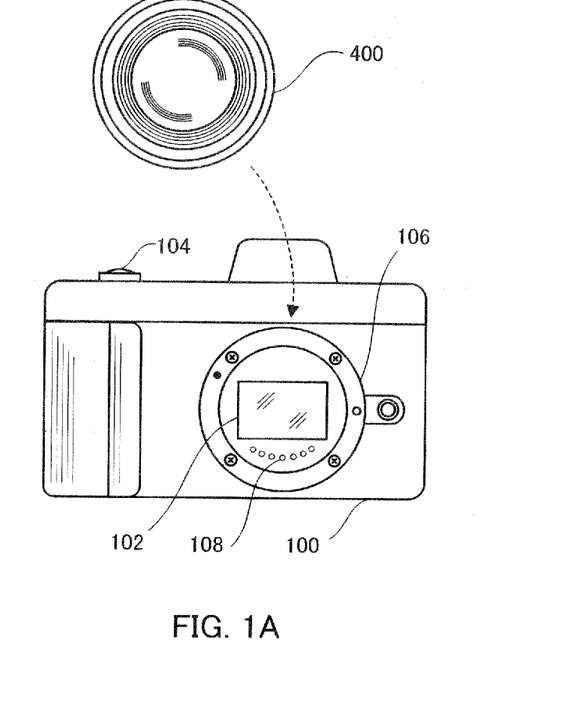
FIG. 1A is a front view illustrating an appearance of a digital camera.
Figure 1B:
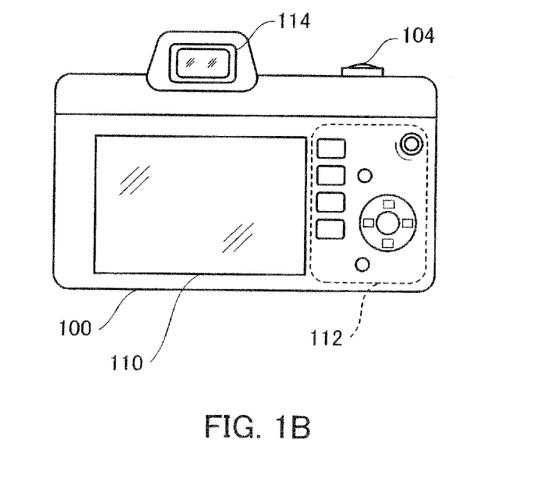
FIG. 1B is a rear view illustrating an appearance of the digital camera.

FIGS. 1A and 1B are views for explaining appearances of a digital camera 100 according to the first embodiment, in which FIG. 1A is a front view and FIG. 1B is a rear view. The digital camera 100 is a still camera of a replaceable photographic-lens type but may be a movie camera capable of still-image photographing. In FIG. 1A, the digital camera 100 is illustrated in a state in which a photographic lens 400 has been removed.

The digital camera 100 includes an image pickup element 102, a release button 104, a mount 106, a connection terminal 108, a display device 110, and an operation member 112. The digital camera 100 may also include an electronic view finder 114 as necessary, and this electronic view finder 114 may be integrally configured with the digital camera 100 or may be configured detachably. In this embodiment, the digital camera 100 provided with the fixed electronic view finder 114 will be described.

The image pickup element 102 photoelectrically converts an image of a subject formed by the photographic lens 400 attached to the digital camera 100 and outputs an image signal. In this embodiment, the image pickup element 102 is a CMOS image sensor, incorporating an amplifier, a CDS (Correlated Double Sampling) circuit, an analog front end including an A/D converter and the like and can output a digital image signal. Moreover, the image pickup element 102 is provided with a capture mode and a monitoring mode as reading modes of the image signal.

The capture mode is a reading mode capable of obtaining an image for recording with relatively high pixels. The monitoring mode is a reading mode for obtaining an image with definition lower than that of an image obtained in the high definition mode and with fewer pixels. A reading speed (frame rate) capable in the monitoring mode can he set higher than the frame rate capable in the capture mode. In the monitoring mode, either of so-called thinning read-out and pixel summation read-out may be performed.

An image obtained in the monitoring mode is mainly used for automatic focusing, automatic exposure adjustment, and display of a live-view image, but moving images can be also recorded on the basis of an image obtained in the monitoring mode. If an image signal transfer speed of the image pickup element 102 is high and processing capability of the digital camera 100 is also high, automatic focusing, automatic exposure adjustment, display of a live-view image, recording of a moving image and the like can be also performed on the basis of an image obtained in the capture mode. This will be described in the second embodiment.

The release button 104 receives a photographing operation by a photographer. When the photographer presses down the release button 104, a release switch performs a two-stage operation in accordance with the stroke. As the release button 104 is continuously pressed, first, a first release switch is turned on, and if the release button 104 is further pressed, a second release switch is turned on. The focusing operation and a photometric operation are performed when the first release switch is turned on, and a photographing operation is performed when the second release switch is turned on.

The mount 106 is a lens attachment unit. which fastens the digital camera 100 and the photographic lens 400 by being fitted with a mount provided on a rear face of the photographic lens 400. The connection terminal 108 is an electric contact formed by aligning a plurality of terminals in an arc shape. By attaching the photographic lens 400 to the mount 106, a contact provided on the photographic lens 400 side is brought into contact with the connection terminal 108. Then, by powering on the digital camera 100, power supply from the digital camera 100 to the photographic lens 400 and mutual communication between the digital camera 100 and the photographic lens 400 is made possible. By outputting a control signal from the digital camera 100 to the photographic lens 400, the focusing operation and a diaphragm adjustment operation are performed on the photographic lens 400 side.

In this embodiment, an example in which the digital camera 100 is configured such that the photographic lens can be replaced will be described, but the digital camera 100 may integrally incorporate the photographic lens. In that case, the mount 106 and the connection terminal 108 can be omitted.

The display device 110 can display character information, icons, images and the like and includes a color liquid crystal display panel, a backlight device and the like. Alternatively, the display device 110 may include a light-emitting display device or the like such as an organic EL display device or the like. When the digital camera 100 is operating in the live-view photographing mode or in the video recording mode, the display device 110 can display a live-view image. Moreover, when the still image photographing operation is completed, the display device 110 can display a photographed image (post-view image).

The operation member 112 includes any one of or a plurality of types of a push-button switch, a dial switch, a slide switch, a touch pad and the like. When the photographer operates the operation member 112, the digital camera 100 can perform start-up, switching of an operation mode, menu setting, start/stop of video recording and the like.

The electronic view finder 114 includes a small color liquid crystal display device, an illuminating device, an observation optical system which enlarges an image displayed on the liquid crystal display device and leads it to the eve of the photographer and the like. Alternatively, the electronic view finder 114 may include a small organic EL display device, an observation optical system which enlarges an image displayed on the organic EL display device and leads it to the eye of the photographer and the like. The electronic view finder 114 can display a live-view image during the still image photographing operation and the video recording operation. The photographer takes photos while observing live-view images displayed on the display device 110 or on the electronic view finder 114 in accordance with a use situation of the digital camera 100.

An example in which the digital camera 100 is operated to perform photographing of a still image will be described below. In photographing the still image, the photographer decides on composition while observing the live-view image displayed on the display device 110 or the electronic view finder 114 and waits for a photo opportunity. After that, the photographer presses down the release button 104, and when turning-on of the first release switch and the second release switch is detected, the digital camera 100 performs the still image photographing operation. In the following, the operation performed by the digital camera 100 when the photographer decides on the composition will be referred to as a live-view display operation. Moreover, the operation performed by the digital camera 100 when the turning-on of the second release switch is detected will be referred to as a still image recording operation.

The digital camera 100 performs the still image recording operation by using the HDR technology and also performs a display operation by using the HDR technology also in the live-view display operation as will be described below.

The HDR technology can reproduce gradation in a wider dynamic range by obtaining one image by synthesizing a plurality of images with different exposures as described above. The images with different exposures mean images with exposure amounts different from each other and are obtained by photographing the same subject with plural types of exposure amounts determined in response to the brightness of a certain subject. In order to obtain a plurality of the images with different exposures, several methods as described below can be used.

With the camera provided with one photographic lens and one image pickup element as the digital camera 100 illustrated in FIG. 1, a plurality of images with different exposures can be obtained by repeating an exposing operation with different exposure amounts in a time series.

The camera provided with plural sets of the photographic lens and the image pickup element can obtain a plurality of images with different exposures by operating these plural sets of the photographic lens and the image pickup element at certain photographing timing substantially simultaneously and with different exposure conditions.

Alternatively, a plurality of images with different exposures can be also obtained with the camera including one photographic lens and a plurality of the image pickup elements. In this case, a beam splitter (optical path splitting member) is arranged in the rear of the photographic lens, and the image pickup elements are arranged on the plurality of optical paths split by the beam splitter. Moreover, a density variable filter capable of changing optical density is arranged between the beam splitter and each of the image pickup elements. By individually adjusting the density of the density variable filter arranged in front of each of the image pickup elements, a plurality of images with different exposures can be obtained. Similar methods may include arrangement of image pickup elements on the plurality of optical paths split by a polarizing beam splitter and arrangement of a polarizing modulation element between an incident surface of the polarizing beam splitter and the photographic lens. In this case, a ratio of a light amount of each subject light led to each image pickup element can be continuously changed through the polarizing beam splitter by electrically adjusting a polarization state by the polarizing modulation element, whereby a plurality of images with different exposures can be obtained.

In order to obtain a plurality of images with different exposures, any one of the above-described methods can be used. That is, the first method is a method of performing the exposing operation several times in a time series while the exposure condition is changed. The second method is a method of setting different exposure conditions for each of the plurality of image pickup systems and photographing substantially simultaneously. The third method is a method of obtaining a plurality of images with different exposure amounts in one session of the exposing operation by leading subject light to the plurality of image pickup elements with different light-amount splitting ratios by the optical path splitting member arranged in the rear of one photographing optical system.

Figure 2:
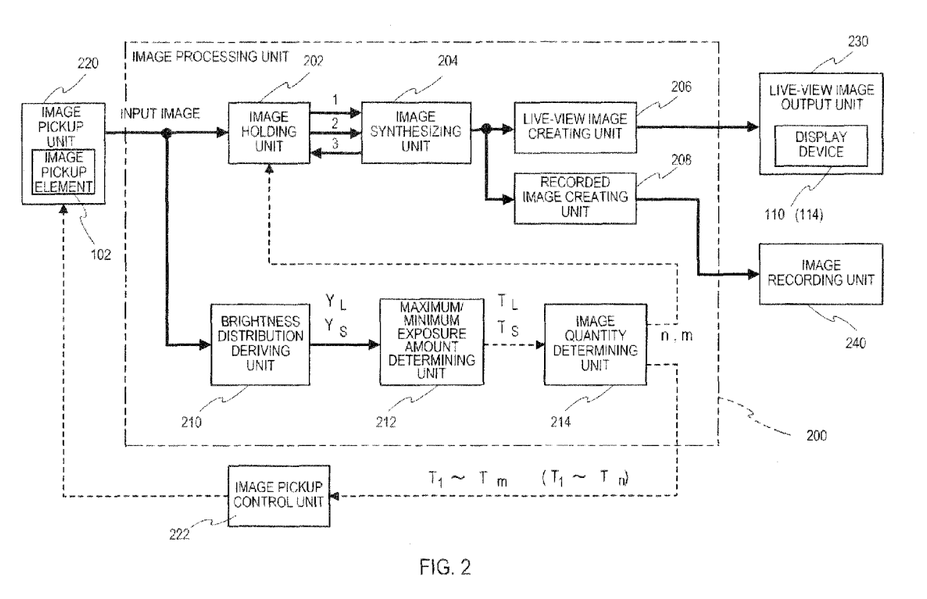
FIG. 2 is a block diagram for explaining an internal configuration of the digital camera according to a first embodiment of the present invention.

FIG. 2 is a block diagram for roughly explaining an internal configuration of the digital camera 100. The digital camera 100 includes an image pickup unit 220, an image processing unit 200, an image pickup control unit 222, a live-view image output unit 230, and an image recording unit 240.

The image processing unit 200 includes an image holding unit 202, an image synthesizing unit. 204, a live-view image creating unit 206, a recorded image creating unit 208, a brightness distribution deriving unit 210, a maximum/minimum exposure amount determining unit 212, and an image quantity determining unit 214. Pipeline processing can be executed from the subsequent stage of the image holding unit 202 to the subsequent stages of the live-view image creating unit 206 and the recorded image creating unit 208. Each of (or all of) the image synthesizing unit 204, the live-view image creating unit 206, the recorded image creating unit 208, the brightness distribution deriving unit 210, the maximum/minimum exposure amount determining unit 212, and the image quantity determining unit 214 may be composed of a logical circuit such as ASIC, FPGA and the like. Alternatively, each of (or all of) them may be composed of a memory storing data, a memory storing arithmetic programs, CPU/DSP (central processing unit/digital signal processor) executing these arithmetic programs and the like.

The live-view image output unit 230 includes the display unit 110 and the electronic view finder 114 described above by referring to FIG. 1 as necessary.

In FIG. 2, relatively bold solid lines, each having an arrow, connecting each of constituent elements to each other indicate data lines and a data transfer directions. Broken lines, each having an arrow, indicate signal lines and transfer directions for transmitting a control parameter or a control signal. The image pickup unit 220, the image holding unit 202, and the brightness distribution deriving unit 210 are connected by the data line. An input image outputted from the image pickup unit 220 is received by the image holding unit 202 and the brightness distribution deriving unit 210. The image holding unit 202 and the image synthesizing unit 204 are connected by three data lines. The two data lines among them are data lines used for transferring data from the image holding unit 202 to the image synthesizing unit 204 and given reference numerals 1 and 2 in FIG. 2. The remaining one data line is a data line used for transferring data from the image synthesizing unit. 204 to the image holding unit 202 and given reference numeral 3 in FIG. 2. The data lines given reference numerals 1 and 2 are used in the interleave method when input images sequentially outputted from the image pickup unit 220 are received by the image synthesizing unit 204 through the image holding unit 202. The data line given reference numeral 3 is used when the image subjected to synthesis processing in the image synthesizing unit 204 when three or more images are to be synthesized is written back in the image holding unit 202. In the following, when these data lines are individually referred to, they are referred to as a data line 1, a data line 2, and a data line 3.

The image synthesizing unit 204 and the live-view image creating unit 206 as well as the recorded image creating unit 208 are connected by data lines. The synthesized image created in the image synthesizing unit 204 is outputted to the live-view image creating unit 206 or the recorded image creating unit 208 through this data line in accordance with the operation mode of the digital camera 100.

The live-view image creating unit 206 and the live-view image output unit 230 are connected by a data line. A live-view image created by the live-view image creating unit 206 is outputted to the live-view image output unit 230 through this data line.

The recorded image creating unit 208 and the image recording unit 240 are connected by a data line. A recorded image created by the recorded image creating unit 208 is outputted to the image recording unit 240 through this data line.

The brightness distribution deriving unit 210 and the maximum/minimum exposure amount determining unit 212 are connected by a data line. Reference characters $Y_L$ and $Y_S$ marked close to this data line mean that brightness image data $Y_L$ and $Y_S$ are outputted from the brightness distribution deriving unit 210 to the maximum/minimum exposure amount determining unit 212.

The maximum/minimum exposure amount determining unit 212 and the image quantity determining unit 214 are connected by a signal line. Reference characters $T_L$ and $T_S$ marked close to this signal line mean that maximum/minimum exposure amount information and $T_S$ are outputted from the maximum/minimum exposure amount determining unit 212 to the image quantity determining unit 214.

The image quantity determining unit 214 and the image holding unit 202 are connected by a signal line. Reference characters n and m marked close to this signal line mean that information relating to the numbers n and m (the number during the live-view display operation is n and the number during a regular image recording operation is m) of the input images obtained during the live-view display operation and the still image recording operation is outputted from the image quantity determining unit 214 to the image holding unit 202.

The image quantity determining unit 214 is also connected to the image pickup control unit 222 by a signal line. Reference characters $T_1$ to $T_m$ ($T_1$ to $T_n$) marked close to this signal line mean that information $T_1$ to $T_m$ or $T_1$ to $T_n$ relating to exposure amounts when a plurality of input images 1 to m or input images 1 to n are obtained during the still image recording operation or the live-view display operation (exposure amount control parameter) is outputted from the image quantity determining unit 214 to the image pickup control unit 222. Exposure amount control parameters during the live-view display operation are $T_1$ to $T_n$, and exposure amount control parameters during the still image recording operation are $T_1$ to $T_m$.

The number of synthesized images during the live-view display operation might be fixed to 2 depending on a relation between a read-out frame rate that can be set in the image pickup element 102 and a display frame rate of the live-view image or the like. In such a case, exposure amount control parameters $T_S$ and $T_L$ during the live-view operation correspond to $T_1$ and $T_2$, respectively, and may be directly outputted from the maximum/minimum exposure amount determining unit 212 to the image pickup control unit 222.

The image pickup control unit 222 and the image pickup unit 220 are connected by a signal line. A signal for controlling the operation mode (capture mode, monitoring mode), a photographing operation timing and/or exposure amount (charge accumulation time) in the image pickup unit 220 is outputted from the image pickup control unit 222 to the image pickup unit 220 through this signal line.

Each of the constituent elements illustrated in FIG. 2 will be described below. The image pickup unit 220 includes the image pickup elements 102, the photographic lens 400, and the mechanical shutter described above and outputs an image created by photoelectrically converting a subject image formed by the photographic lens 400 to the image processing unit 200 as an input image. If the image pickup element 102 is capable of a so-called electronic shutter type exposing (accumulating) operation, the mechanical shutter can be omitted. The electronic shutter means an exposing method in which start timing and end timing of the accumulating operation in each pixel on the image pickup element 102 are controlled so that the exposure amount is controlled without using a mechanical shutter. If the image pickup element 102 uses exposure of the electronic shutter type, the exposing operation is performed preferably in the global shutter method since an image is not distorted during photographing of a moving object and the like.

The image processing unit 200 will be described. The operation of the image processing unit 200 is somewhat different between the live-view display operation and the still image recording operation of the digital camera 100. First, the operation of the image processing unit 200 when the digital camera 100 is performing the live-view display operation will be described and then, the operation of the image processing unit 200 when the digital camera 100 is performing the still image recording operation will be described.

As described above, in the digital camera 100 according to this embodiment, the HDR technology is used also when the camera performs the live-view display operation. The image processing unit 200 repeatedly creates one live-view image by processing a plurality of input images (images with different exposures) obtained from the image pickup unit 220. As a result, creation and display of the live-view image of HDR are made possible. In this embodiment, n pieces of input images are used for creating one live-view image. Here, n is an integer not less than 2. This n corresponds to the number n of the plurality of input images obtained as described above.

As the value n becomes larger, a live-view image can be displayed with reproduced gradation in response to the subject with a wider brightness range. However, considering a focusing speed when automatic focusing is executed by a contract detection method, follow-up performance of display of the live-view image in a sudden panning operation of the digital camera 100 when a relatively quick moving subject is being framed, or wear of a battery caused by an increase in a processing load in the image processing unit 200 and the like, it is preferable that the value of n is not set too large. For facilitation of understanding, the case of n=2 as an example will be described below.

The image pickup unit 220 repeatedly performs an operation of obtaining n pieces of (here, two) images with different exposures during the live-view display operation. In this embodiment, the case of obtaining two input images with different exposures by using the first method among the three methods described above will be described. Moreover, methods of changing the exposure condition (exposure amount) include a method of changing a diaphragm value of the photographic lens 400 and a method of changing exposure time (shutter time). Alternatively, a method of sequentially changing optical density by arranging a filter capable of electrically changing the optical density on an incident surface of the photographic lens 400 or between the photographic lens 400 and the image pickup element 102 can be also used. In the following, a method of changing the exposure time in order to change the exposure amount will be described, as an example. In this case, the exposure amount control parameters $T_1$ to $T_n$ outputted from the image quantity determining unit 214 to the image pickup control unit 222 are information relating to exposure time when a plurality of input images 1 to n are obtained during the live-view display operation.

The image holding unit 202 is a buffer composed of an SDRAM (Synchronous Dynamic Random Access Memory) or the like and temporarily stores two input images obtained from the image pickup unit 220. The image synthesizing unit 204 creates a synthesized image by synthesizing two input images with different exposures obtained from the image pickup unit 220. If the digital camera 100 is held by hand or a subject is a moving object, images might be largely shifted between the two input images. In that case, the image synthesizing unit 204 can execute processing of cutting-out, pasting and the like of images by using a pattern matching technology so that the synthesized images do not fail. Moreover, since a shift in images is not conspicuous in a moving image such as a live-view image, the processing such as cutting-out, pasting and the like of the image as described above can be omitted. In that case, a processing load of the image processing unit 200 is decreased, and thus, power consumption can be suppressed.

The synthesized image created by the image synthesizing unit 204 during the live-view display operation is outputted to the live-view image creating unit 206. The live-view image creating unit 206 applies demosaicing, white balance, or collection processing of hues, color intensity, contrast and the like to the received synthesized image so as to create a live-view image and outputs it to the live-view image output unit 230. The live-view image output unit 230 executes processing of outputting the live-view image. The live-view image can be outputted and displayed on the display device 110 or the electronic view finder 114. Alternatively, the image data can be outputted to an external display device or the like through a wired or a wireless interface provided in the digital camera 100.

The image pickup unit 220 repeatedly performs the operation of obtaining the two images with different exposures (input images). Then, the image holding unit 202, the image synthesizing unit 204, the live-view image creating unit 206, and the live-view image output unit 230 repeatedly process the input images obtained from the image pickup unit 220, to perform the live-view display operation.

The processing executed by the brightness distribution deriving unit 210, the maximum/minimum exposure amount determining unit 212, the image quantity determining unit 214, and the image pickup control unit 222 while the live-view display operation is performed, will be described below.

The brightness distribution deriving unit 210 repeatedly performs processing of creating one set of brightness image data corresponding to one input image obtained from the image pickup unit 220. The brightness image data is data for roughly evaluating the brightness distribution of a photographed scene (subject) and may include color information, but the color information is not always necessary.

For example, if the image pickup element 102 is a single-plate image pickup element having an on-chip color filter of the Bayer array, the brightness information can be created from a value obtained by adding pixel values of four pixels constituting one array unit (block), corresponding to this block. Alternatively, the brightness information can be also created from a value obtained by adding up pixel values of green (G) pixels in one block.

Moreover, the brightness information can be created by converting RGB image data, which is obtained by applying demosaicing processing to the input image, to image data of a color space of YCbCr and by using the Y value. It is needless to say that the brightness image data may be created by converting the input image to image data of other color spaces such as HSL and by using data relating to the brightness among them. The brightness image data shows the brightness distribution of the entire image and it does not necessarily have to hold the number of pixels of the input image as it is. Therefore, the number of pixels of the brightness image data can be decreased in accordance with processing capability of the image processing unit 200, allowable power consumption and the like.

In this embodiment, two input images with different exposures are obtained in order to obtain one live-view image during the live-view display operation. As described above, the exposure time is changed in this embodiment in order to obtain input images with different exposures, thus these two input images with different exposures are discriminated and called a short exposure input image and a long exposure input image, respectively. That is, the brightness distribution deriving unit 210 alternately obtains the short exposure input image and the long exposure input image from the image pickup unit 220 and creates the brightness image data $Y_S$ from the short exposure input image and the brightness image data $Y_L$ from the long exposure input image data, respectively, and outputs them to the maximum/minimum exposure amount determining unit 212. This operation is repeatedly performed by the brightness distribution deriving unit 210 during the live-view display operation.

The maximum/minimum exposure amount determining unit 212 evaluates the brightness image data $Y_S$ and $Y_L$ and determines the maximum exposure amount and the minimum exposure amount when a plurality of input images with different exposures are obtained by the image pickup unit 220. Since the exposure amount is adjusted by adjusting the exposure time in this embodiment, the maximum/minimum exposure amount determining unit 212 determines the maximum exposure time $T_L$ and the minimum exposure time $T_S$. A method of determining the maximum exposure time $T_L$ and the minimum exposure time $T_S$ by the maximum/minimum exposure amount determining unit 212 will be described later. The maximum/minimum exposure amount determining unit 212 outputs the information of the maximum exposure time $T_L$ and the minimum exposure time $T_S$ (maximum/minimum exposure amount information) to the image quantity determining unit 214.

The image quantity determining unit 214 determines the number n of the input images with different exposures obtained during the live-view display operation on the basis of the maximum exposure time $T_L$ and the minimum exposure time $T_S$. In this example, it is determined to be n=2. Subsequently, the image quantity determining unit 214 creates the exposure amount control parameters $T_1$ to $T_n$ and outputs them to the image pickup control unit 222. Specifically, since n=2, the image quantity determining unit 214 outputs the minimum exposure time $T_s$ as $T_1$ and the maximum exposure time $T_L$ as $T_2$ to the image pickup control unit 222. If n is determined to be 3, the image quantity determining unit 214 sets the minimum exposure time $T_s$ to $T_1$ and the maximum exposure time $T_L$ to $T_3$, and determines $T_2$ corresponding to an intermediate exposure time on the basis of the minimum exposure time $T_S$ and the maximum exposure time $T_L$. The same applies to a case in which n is 4 or more.

The image pickup control unit 222 controls the image pickup unit 220 so that photographing is performed on the basis of the exposure amount control parameter outputted from the image quantity determining unit 214, that is, $T_1$ and $T_2$ in this example. As a result, the image pickup unit 220 performs the photographing operation for obtaining data of two input images with different exposures and sequentially outputs the plurality of input images to the image holding unit 202.

Figure 3:
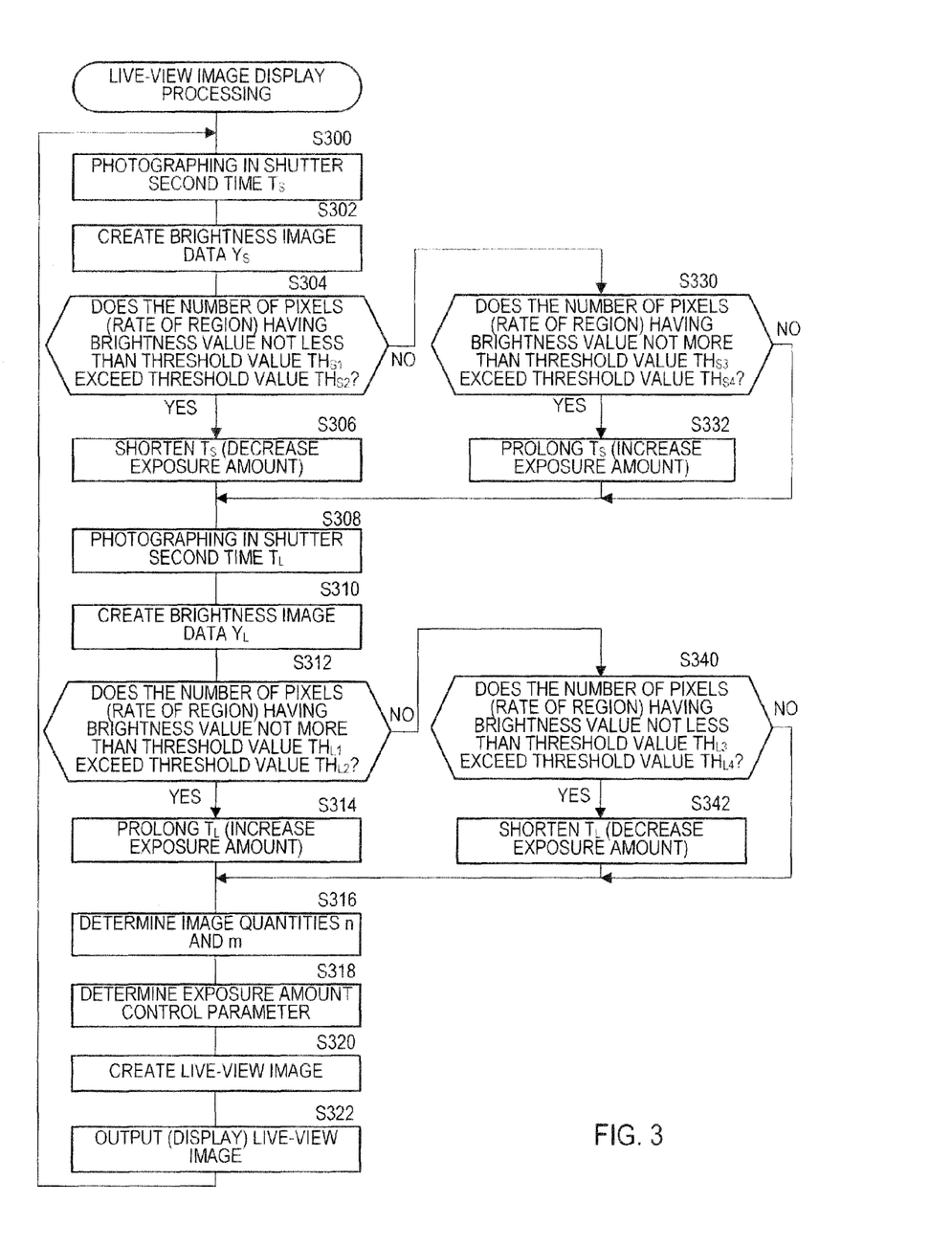
FIG. 3 is a flowchart for explaining a processing procedure executed by an image processing unit during a live-view display operation.

FIG. 3 is a flowchart for roughly explaining a procedure of live-view image display processing executed by the image processing unit 200 during the live-view display operation. The processing procedure illustrated in FIG. 3 is executed when the digital camera 100 is powered on and the operation mode thereof is switched to the still image photographing mode. Actually, contrast detection for automatic focusing, processing for automatic focusing, and processing of detecting that the release button 104 has been pressed by the photographer and the like, are executed. However, for simplification of the explanation and facilitation of understanding, illustration and explanation of those processing procedures will be omitted.

At S300, the image processing unit 200 transmits a control signal of photographing start along with the exposure amount control parameter $T_1$ to the image pickup control unit 222. As a result, the image pickup unit 220 performs the photographing operation in shutter time $T_1$. This shutter time $T_1$ is equal to shutter time $T_S$ which corresponds to the minimum exposure amount.

At S302, the image processing unit 200 processes the input image obtained in response to the photographing in the shutter time $T_S$ and creates the brightness image data $Y_S$. This processing corresponds to processing by the brightness distribution deriving unit 210 in FIG. 2.

Figure 4A:
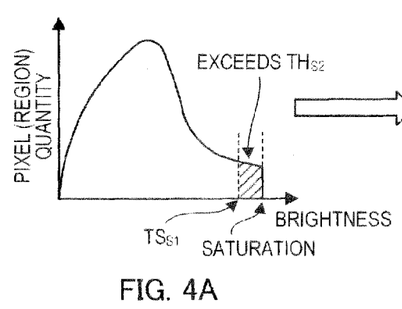
FIG. 4A is a histogram of an input image obtained by photographing before processing at S304 and S306 in the flowchart in FIG. 3.
Figure 4B:
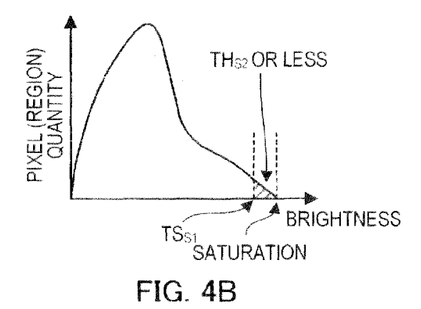
FIG. 4B is a histogram of an input image obtained by photographing after the processing at S304 and S306 in the flowchart in FIG. 3.
Figure 5A:
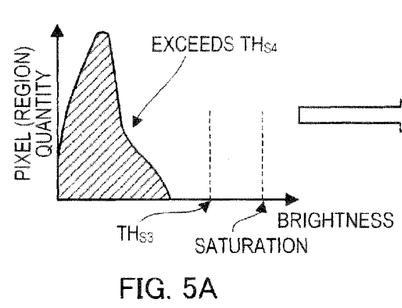
FIG. 5A is a histogram of an input image obtained by photographing before processing at S330 and S332 in the flowchart in FIG. 3.
Figure 5B:
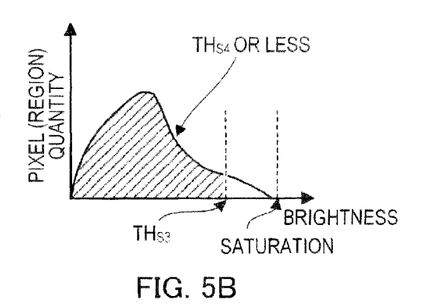
FIG. 5B is a histogram of an input image obtained by photographing after the processing at S330 and S332 in the flowchart in FIG. 3.

The image processing unit 200 executes processing of determining the minimum exposure amount (minimum exposure time) $T_S$ by evaluating the brightness image data $Y_S$ at S304, S306, S330, and S332. The processing at these steps will be described by referring to FIGS. 4A and 4B and FIGS. 5A and 5B. FIGS. 4A and 4B and FIGS. 5A and 5B are diagrams for conceptually explaining the processing executed at S304, S306, S330, and S332. FIGS. 4A and 5A illustrate histograms of the brightness image data $Y_S$ obtained from input images obtained in the photographing before execution of the processing at these steps. FIGS. 4B and 5B illustrate histograms of the brightness image data $Y_S$ obtained from the input images obtained in the photographing after the execution of the processing at these steps.

At S304, processing of counting the number of pixels (regions) having a brightness value not less than a threshold value $TH_{S1}$ by evaluating the brightness image data $Y_S$ is performed, and determination is made on whether the number of pixels (number of regions) exceeds the threshold value $TH_{S2}$ or not. If this determination is positive, the processing proceeds to S306, while if the determination is negative, the processing proceeds to S330.

If the determination at S304 is positive, the image processing unit 200 executes, at S306, processing of reducing the minimum exposure time $T_S$ (decreasing the minimum exposure amount) which will be applied when an input image for the subsequent live-view image display is obtained by the photographing operation. The processing at S304 and S306 will be described by referring to FIGS. 4A and 4B.

It is assumed that the brightness image data $Y_S$ subjected to the determination processing at S304 has a histogram as illustrated in FIG. 4A. In the example in FIG. 4A, the number of pixels having the brightness not less than the threshold value $TH_{S1}$ exceeds the threshold value $TH_{S2}$. That is, if the number of pixels in a considerably bright section or a blown-out section is large in the brightness image data $Y_S$ corresponding to the somewhat underexposed input images photographed in the minimum exposure time $T_S$, the determination at S304 is positive. In such a case, the image processing unit 200 shortens the minimum exposure time $T_S$ at S306.

As a result, the histogram of the brightness image data $Y_S$ derived from the input image obtained by the photographing performed in the subsequent cycle becomes as illustrated in FIG. 4B. The threshold values $TH_{S1}$ and $TH_{S2}$ can be set variously in accordance with the photographing situations or operation setting of the digital camera 100 and the like. Preferably, the threshold values $TH_{S1}$ and $TH_{S2}$ are set such that the determination at S304 is negative in the situation where there is substantially no blown-out section in the brightness image data $Y_S$ (situation as exemplified in FIG. 4B).

If the determination at S304 is negative, the image processing unit 200 evaluates the brightness image data $Y_S$, counts the number of pixels (regions) having the brightness value not more than the threshold value $TH_{S3}$ and determines whether the number of pixels (the number of regions) exceeds the threshold value $TH_{S4}$ or not at S330. If this determination is positive, the processing proceeds to S332, while if the determination is negative, the processing proceeds to S308.

If the determination at S330 is positive, the image processing unit 200 prolongs, at S332, the minimum exposure time $T_S$ (increases the minimum exposure amount) which will be applied when the input image for the subsequent live-view image display is obtained by the photographing operation. The processing at S330 and S332 will be described by referring to FIGS. 5A and 5B. Here, it is assumed that the brightness image data $Y_S$ subjected to the determination processing at S330 has a histogram as illustrated in FIG. 5A.

In the example in FIG. 5A, the number of pixels having the brightness value not more than the threshold value $TH_{S3}$ exceeds the threshold value $TH_{S4}$. That is, if the brightness image data $Y_S$ corresponding to the somewhat underexposed input image photographed in the minimum exposure time $T_S$ is dark (somewhat blocked-up shadows) in general, the determination at S330 is positive. In such a case, at S332, the image processing unit 200 prolongs the minimum exposure time $T_S$. As a result, the histogram of the brightness image data $Y_S$ derived from the input image obtained by the photographing performed in the subsequent cycle becomes as illustrated in FIG. 5B. Then, more gradation information can be obtained from the input image corresponding to the brightness image data $Y_S$.

The threshold values $TH_{S3}$ and $TH_{S4}$ can be set variously in accordance with the photographing situations, the operation setting of the digital camera 100 and the like. FIG. 5B illustrates a situation in which the brightness value in the brightness image data $Y_S$ is not saturated very much with high brightness (there are only few pixels causing blown-out highlights) and the number of pixels in a relatively high brightness region becomes an appropriate quantity. Preferably, threshold value $TH_{S3}$ and $TH_{S4}$ are set such that the determination at S330 becomes negative in a situation as exemplified in FIG. 5B.

The processing at S330 and S332 are conducted in order to return the exposure amount to an appropriate value if the high brightness section in the photographing range is lost, for example, when the photographed scene is largely changed, or when the subject has moved significantly.

At S308, the image processing unit 200 transmits a control signal of photographing start along with the exposure amount control parameter $T_2$ to the photographing control unit 222. As a result, the photographing operation is started in the image pickup unit 220, and the photographing operation in shutter time $T_2$ is performed. This shutter time $T_2$ is equal to shutter time $T_L$ which corresponds to the maximum exposure amount.

The image processing unit 200 processes the input, image obtained by the photographing in the shutter time $T_L$ at S302 and creates the brightness image data $Y_L$. This processing corresponds to the processing in the brightness distribution deriving unit 210 in FIG. 2.

Figure 6A:
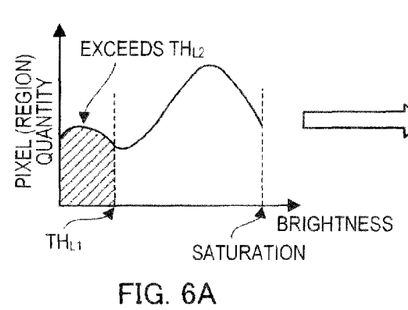
FIG. 6A is a histogram of an input image obtained by photographing before processing at S312 and S314 in the flowchart in FIG. 3. FIG, 6B is a histogram of an input image obtained by photographing after the processing at S312 and S314 in the flowchart in FIG. 3.
Figure 6B:
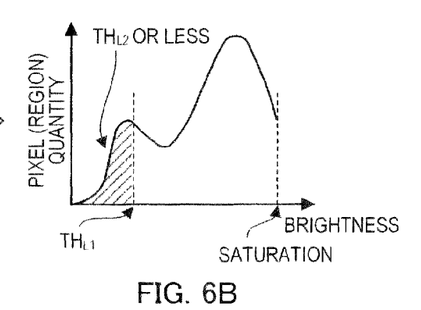
Figure 7A:
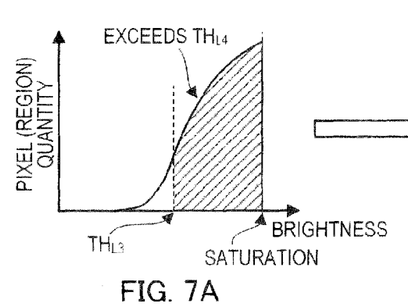
FIG. 7A is a histogram of an input image obtained by photographing before processing at S340 and S342 in the flowchart in FIG. 3.
Figure 7B:
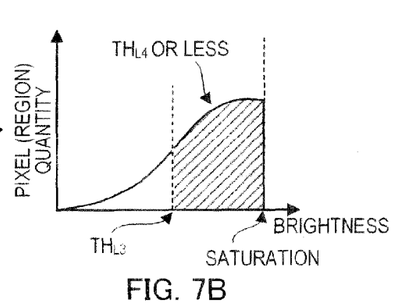
FIG. 7B is a histogram of an input image obtained by photographing after the processing at S340 and S342 in the flowchart in FIG. 3.

The image processing unit 200 executes the processing of determining the maximum exposure amount (maximum exposure time) $T_L$ by evaluating the brightness image data $Y_L$ at S312, S314, S340, and S342. The processing at these steps will be described by referring to FIGS. 6A and 6B and also to FIGS. 7A and 7B. FIGS. 6A and 6B as well as FIGS. 7A and 7B are diagrams for conceptually explaining the processing executed at S312, S314, S340, and S342. FIGS. 6A and 7A illustrate histograms of the brightness image data $Y_L$ obtained from the input images obtained by the photographing before the execution of the processing at these steps. FIGS. 6B and 7B illustrate histograms of the brightness image data $Y_L$ obtained from the input images obtained by the photographing after the execution of the processing at these steps.

At S312, the processing of counting the number of pixels (regions) having the brightness value not more than the threshold value $TH_{L1}$ is executed by evaluating the brightness image data $Y_L$ and it is determined whether the number of pixels (regions) exceeds the threshold value $TH_{L2}$ or not. If this determination is positive, the processing proceeds to S314, while if this determination is negative, the processing proceeds to S340.

If the determination at S312 is positive, the image processing unit. 200 executes. at S314, processing to prolong the maximum exposure time $T_L$ (to increase the maximum exposure amount) which is applied when the input image for the subsequent live-view image display is obtained by the photographing operation. The processing at S312 and S314 will be described by referring to FIGS. 6A and 6B.

It is assumed that the brightness image data $Y_L$ subjected to the determination processing at S312 has a histogram as illustrated in FIG. 6A. In the example in FIG. 6A, the number of pixels having the brightness value not more than the threshold value $TH_{L1}$ exceeds the threshold value $TH_{L2}$. That is, though it is the brightness image data $Y_L$ corresponding to the somewhat overexposed input image photographed in the maximum exposure time $T_L$, if the number of pixels in a considerably dark section or a blocked-up section is large, the determination at S312 becomes positive. In such a case, the image processing unit 200 prolongs the maximum exposure time $T_L$ at S314.

As a result, the histogram of the brightness image data $Y_L$, derived from the input image obtained in the photographing performed in the subsequent cycle becomes as illustrated in FIG. 6B. The threshold values $TH_{L1}$ and $TH_{L2}$ can be set variously in accordance with the photographing situations or operation setting of the digital camera 100 and the like. Preferably, the threshold values $TH_{L1}$ and $TH_{L2}$ are set such that the determination at S312 is negative in the situation where there is substantially no blocked-up section in the brightness image data $Y_L$ (situation as exemplified in FIG. 6B).

If the determination at S312 is negative, the image processing unit 200 evaluates the brightness image data $Y_L$, counts the number of pixels (regions) having the brightness value not less than the threshold value $TH_{L3}$ and determines whether the number of pixels (the number of regions) exceeds the threshold value $TH_{L4}$ or not at S340. If this determination is positive, the processing proceeds to S342, while if the determination is negative, the processing proceeds to S316.

If the determination at S340 is positive, the image processing unit 200 shortens the maximum exposure time $T_L$ (decreases the minimum exposure amount) at S342 when the input image for the subsequent live-view image display is obtained by the photographing operation. The processing at S340 and S342 will be described by referring to FIGS. 7A and 7B.

It is assumed that the brightness image data $Y_L$ subjected to the determination processing at S340 has a histogram as illustrated in FIG. 7A. In the example in FIG. 7A, the number of pixels having the brightness value not less than the threshold value $TH_{L3}$ exceeds the threshold value $TH_{L4}$. That is, if the brightness image data $Y_L$ corresponding to the somewhat overexposed input image photographed in the maximum exposure time $T_L$ is relatively bright (blown-out highlights) in general, the determination at S340 is positive. In such a case, the image processing unit 200 shortens the maximum exposure time $T_S$ at S342.

As a result, the histogram of the brightness image data $Y_L$ derived from the input image obtained by the photographing performed in the subsequent cycle becomes as illustrated in FIG. 7B. Then, more gradation information can be obtained from the color image data corresponding to the brightness image data $Y_L$.

The threshold values $TH_{L3}$ and $TH_{L4}$ can be set variously in accordance with the photographing situations, the operation setting of the digital camera 100 and the like. FIG. 7B illustrates a situation in which the brightness value in the brightness image data $Y_L$ is not saturated very much with low brightness (there are only few pixels causing blocked-up shadows) and the number of pixels in a relatively low brightness region is distributed as appropriate. Preferably, threshold values $TH_{L3}$ and $TH_{L4}$ are set such that the determination at S340 becomes negative in a situation as exemplified in FIG. 7B.

The processing at S340 and S342 is performed in order to return the exposure amount to an appropriate value if the low brightness unit in the photographing range is lost, for example, when the photographed scene is largely changed, or when the subject has moved significantly.

The processing executed at S304, S306, S330, S332, S312, S314, S340, and S342 corresponds to the processing in the maximum/minimum exposure amount determining unit 212. Regarding exposure adjustment during the life-view display operation, an average of the brightness values is acquired for the entire image, a central part in the image or a part where a major subject is present (if the major subject is recognized) in general and set such that the exposure amount is close to a standard value. In this regard, in this embodiment, the processing at S304, S306, S330, and S332 suppresses blown-out highlights in the input image obtained by the shortest exposure time $T_S$, while the processing at S312, S314, S340, and S342 suppresses blocked-up shadows in the input image obtained by the longest exposure time $T_L$. However, the processing of the maximum/minimum exposure amount determination described above is an example and the largest exposure time $T_L$ and the shortest exposure time $T_S$ may be determined by other methods.

At S316, the image processing unit 200 determines the number n (n=2 in this example) of the input images to be obtained when the live-view image is created and the number m of the input images to be obtained when the image for recording is created. The number m can be acquired by the following formula (1), for example. In the formula (1), int{ } is a function of taking a value of an integer unit rounded down to the closest whole number of a calculation result in { }. For example, regardless of whether the calculation result in { } is 3.0 or 3.9, int{ } is 3, and thus, the value of m is 4.

$$m=\text{int}\{\log_2(T_L/T_S)\}+1 \qquad (1)$$

The number n may have the same value as the number m or a half of the value of m. If the value of m is not an integer, the value is rounded down or off to the nearest whole number. Alternatively, the number n may he a number not more than m and the upper limit number by which the live-view display operation can be performed smoothly. Moreover, the number n may be fixed to n=2 regardless of the value of m.

At S318, the image processing unit 200 determines the exposure amount control parameters $T_1$ to $T_n$, and $T_1$ to $T_m$ in accordance with the values of n and m determined at S316. The processing at S316 and S318 corresponds to the processing in the image quantity determining unit 214.

At S320, the image processing unit 200 synthesizes the two input images with different exposures obtained in response to the processing at S300 and S308 and creates a live-view image by processing of demosaicing, color correction, gradation correction and the like. The processing at S320 corresponds to the processing at the image synthesizing unit. 204 and the live-view image creating unit 206.

When two input images with different exposures are to be synthesized, the image processing unit 200 can create the synthesized image by mixing the pixel values of pixels at the same pixel positions of the both input images for all the pixels by using the following formula (2). In the formula (2), $I_L$ is a pixel value at a corresponding pixel position of the long exposure image, $I_S$ is a pixel value at a corresponding pixel position of the short exposure image, $T_L$ is an exposure amount (exposure time) when the long exposure image is obtained, and $T_S$ is an exposure amount (exposure time) when the short exposure image is obtained. Moreover, a function $f(I_L)$ gives a real number from 0 to 1 in accordance with the value of the pixel value $I_L$ of the short exposure image and derives a value corresponding to a so-called weighting coefficient when the pixel values $I_L$ and $I_S$ are synthesized (mixed). The function $f(I_L)$ may be expressed by a primary expression or high-degree polynomial expression with the pixel value $I_L$ as a variable, or other calculation algorithms and the like. Alternatively, a value corresponding to the pixel value $I_L$ may be read out as $f(I_L)$ from a lookup table prepared in advance in the image processing unit 200.

$$\text{Synthesized pixel value } I_{MIX}=f(I_L)\times(T_L/T_S)\times I_S+\{1-f(I_L)\}\times I_L \qquad (2)$$

At S322, the image processing unit 200 transmits a control signal to the live-view image output unit 230. The live-view image output unit 230 having received this control signal outputs the live-view image created at S320 to the display device 110 or the electronic view finder 114. The live-view image output unit 230 may output a live-view image to an external device connected to the digital camera 100 through the wired or wireless interface as described above.

Until the operation of the release button or an operation of an operation mode switching by the photographer is detected, the above-described processing is repeated, and the live-view display operation is performed. At this time, the determination at S304, S330, S312, and S340 is made as appropriate and as a result, the values of the minimum exposure time $T_S$ and the maximum exposure time $T_L$ are updated at any time in accordance with a change in the photographing situation at S306, S332, S314, and S342. Similarly, at S316 and S318, the values of the image quantities n and m and the exposure amount control parameters $T_1$ to $T_n$, and $T_1$ to $T_m$ are updated at any time in accordance with a change in the photographing situation.

Figure 8:
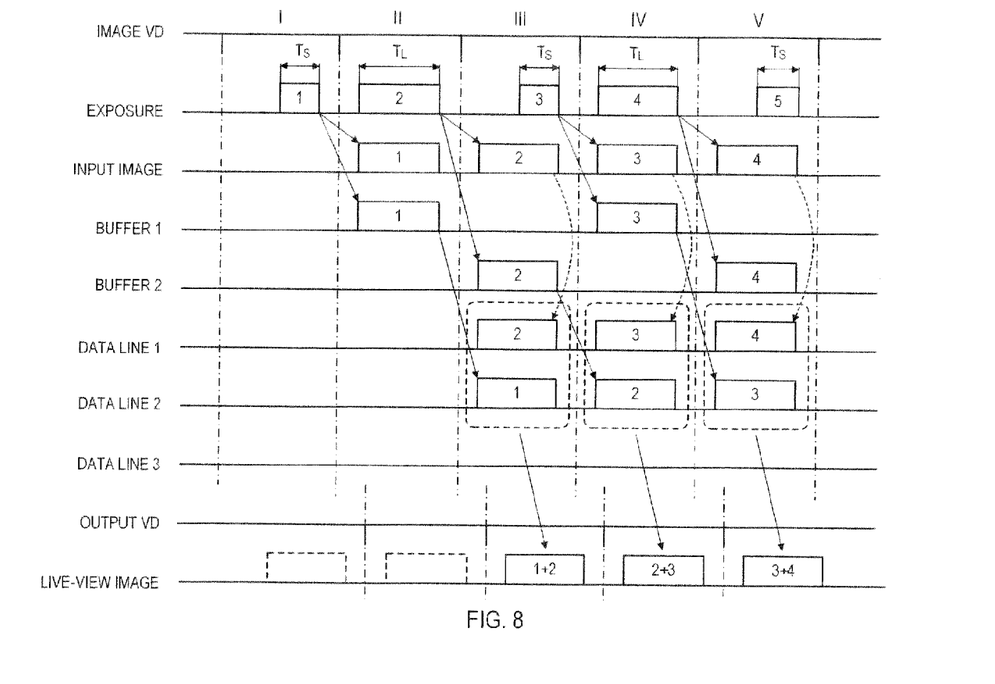
FIG. 8 is a timing chart for explaining operation timing when the live-view display operation is performed.

FIG. 8 is a timing chart illustrating operation timing when the live-view display operation is performed. In FIG. 8, each of reference characters I, II, . . . V illustrated in the lateral direction indicates a frame section. In the following, the frame sections will be referred to as a frame section I, a frame section II and the like, and the operation indicated in FIG. 8 will be described. An image pickup VD is a vertical synchronization signal outputted from the image pickup control unit 222, and the photographing operation performed by the image pickup unit 220 and the processing executed by the image processing unit 200 are executed in synchronization with this image pickup VD. An output VD is outputted at timing corresponding to a delay by the processing of the image processing unit 200 with respect to the timing of the image pickup VD.

In each of the frame sections I, II, . . . , a photographing operation (exposing operation) performed by the image pickup unit 220 will be referred to as exposure 1, exposure 2, . . . . After the exposure 1, the exposure 2, . . . , the input images read out by the image pickup unit 220 will be referred to as an input image 1, an input image 2, . . . .

In the frame section I, the exposure 1 (short exposure image: exposure time $T_S$) is performed. In the frame section II, the exposure 2 (long exposure image: exposure time $T_L$) is performed. The input image 1 (the input image obtained as the result of the exposure 1) outputted from the image pickup unit 220 in this frame section 11 is written in a buffer 1 in the image holding unit 202.

In the frame section III, the exposure 3 (short exposure image: exposure time $T_S$) is performed. This exposure time $T_S$ is different from the exposure time $T_S$ in the frame section I if the processing at S306 or S332 is executed. The input image 2 (the input image obtained as the result of the exposure 2) outputted from the image pickup unit 220 in this frame section III is written in a buffer 2 in the image holding unit 202. At this time, the input image 2 is outputted through to the data line and the input image 1 of the buffer 1 is outputted to the data line 2 in synchronization with that. Then, the input image 1 and the input image 2 are synthesized in the image synthesizing unit 204. On the basis of a synthesized image into which the input image 1 and the input image 2 are synthesized, a live-view mage is created in the live-view image creating unit 206, outputted from the live-view image output unit 230 in synchronization with the output VD and displayed on the display device 110 and the like.

In a frame section IV, the exposure 4 (long exposure image: exposure time $T_L$) is performed. This exposure time $T_L$ is also different from the exposure time $T_L$ in the frame section II if the processing at S314 or S342 is executed similarly to the exposure time $T_S$ in the frame section III. In the frame section IV, an input image 3 outputted from the image pickup unit 220 is written in the buffer 1. At this time, the input image 3 is outputted through to the data line 1 and the input image 2 of the buffer 2 is outputted to the data line 2 in synchronization with that. Then, the input image 2 and the input image 3 are synthesized in the image synthesizing unit 204. On the basis of a synthesized image into which the input image 2 and the input image 3 are synthesized, a live-view image is created in the live-view image creating unit 206, outputted from the live-view image output unit 230 in synchronization with the output VD and displayed on the display device 110 and the like.

In the frame section V, the exposure 5 (long exposure image: exposure time $T_S$) is performed. The exposure time $T_S$ is also different from the exposure time $T_S$ in the frame section III if the processing at S306 or S332 is executed. In the frame section V, an input image 4 outputted from the image pickup unit 220 is written in the buffer 2 in the image holding unit 202. At this time, the input image 4 is outputted through to the data line 1 and the input image 3 of the buffer 1 is outputted to the data line 2 in synchronization with that. Then, the input image 3 and the input image 4 are synthesized in the image synthesizing unit 204. On the basis of a synthesized image into which the input image 3 and the input image 4 are synthesized, a live-view image is created in the live-view image creating unit 206, outputted to the live-view image output unit 230 in synchronization with the output VD and displayed on the display device 110 and the like.

By executing the processing illustrated in the timing chart. in FIG. 8, a live-view image can be outputted with a delay substantially equal to the prior-art live-view display operation without image synthesis, even in the live-view display operation with synthesis of a plurality of input images. As a result, responsiveness of the live-view image can be ensured.

Subsequently, a case in which main exposure is started in the digital camera 100 and the image processing unit 200 is performing the still image recording operation will be described by referring to FIG. 2 again. At start of the still image recording operation, the image pickup unit 220 performs m sessions of the photographing operation for the same subject and creates m pieces of the input images with different exposures. The number m is, as described above, determined by the image quantity determining unit 214 during the live-view display operation. Moreover, as described above, the image quantity determining unit 214 determines the exposure time $T_1$ to $T_m$ when m sessions of the photographing operation are performed by the image pickup unit 220 during the live-view display operation.

In the still image recording operation, processing which will be described below is executed in the image holding unit 202, the image synthesizing unit 204, and the recorded image creating unit 208 in the image processing unit 200.

The image holding unit 202 stores m pieces of the input images sequentially outputted from the image pickup unit 220 with m sessions of the photographing operation. After that, while the processing of image synthesis is performed in the image synthesizing unit 204, transfer of the input image and the synthesized image is repeatedly performed between the image holding unit 202 and the image synthesizing unit 204 through the date lines 1, 2, and 3, and one synthesized image is created in the end.

Figure 9:
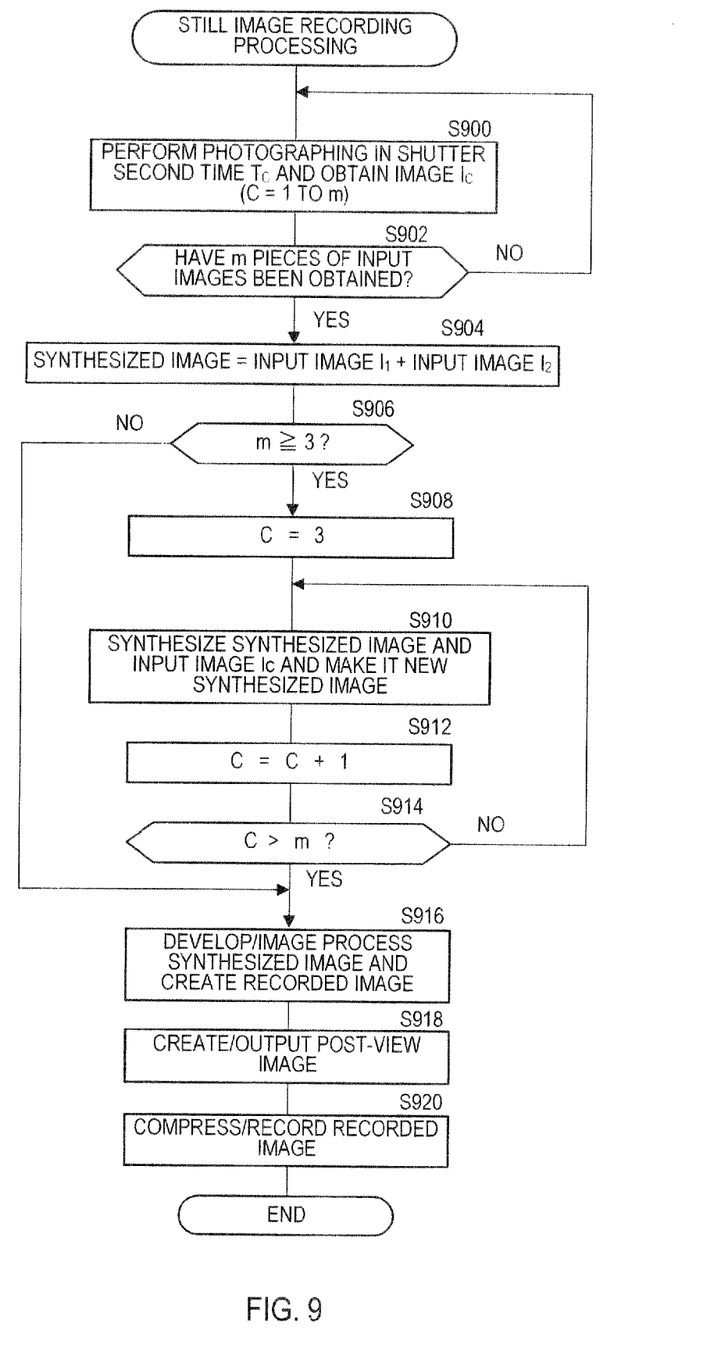
FIG. 9 is a flowchart for explaining a processing procedure executed by the image processing unit when still image recording processing is performed.

FIG. 9 is a flowchart for roughly explaining a procedure of the still image recording processing executed by the image processing unit 200 with start of the main exposure. The processing procedure illustrated in FIG. 9 is started when the release. button 104 of the digital camera 100 is pressed during the live-view display operation, and the first release switch and the second release switch are turned on. It is assumed that m takes a value not, less than 2.

At S900, the image processing unit 200 transmits a control signal of photographing start along with the exposure control parameter $T_C$ to the image pickup control unit 222. As a result, in the image pickup unit 220, the photographing operation in the shutter time $T_C$ (C=1 to m) is performed, and the input image is temporarily stored in the image holding unit 202. At S902, it is determined whether m pieces of the input images have been obtained or not. While the determination at S902 is negative, the processing at S900 and S902 is repeatedly executed, and m pieces of the input images are obtained in the end and temporarily stored in the image holding unit 202. Regarding the shutter time $T_C$, it is assumed that the larger the value of C becomes, the more the value of $T_C$ increases. That is, it is assumed that while m sessions of the photographing operation are performed, the shutter time in the first session of the photographing operation is the shortest shutter time. If the determination at S902 is positive, the processing proceeds to S904.

At S904, the image processing unit 200 outputs input images $I_1$ and $I_2$ to the data line 1 and the data line 2, respectively, and creates a synthesized image. In the synthesis, the formula (2) can be used. The processing at S904 corresponds to the processing in the image synthesizing unit 204. At S906, the image processing unit 200 determines whether the number m of input images is 3 or more, and if the determination is positive, the processing proceeds to S908, while if the determination is negative, the processing proceeds to S916. That is, if the number m of the input images is 2 (S906: NO), image synthesis is completed by the processing at S904, and thus, the processing from S908 to S914 is skipped.

If the determination at S906 is positive, that is, if it is determined that the number m of the input images is 3 or more, the image processing unit 200 substitutes 3 as an initial value of a loop counter C at S908.

At S910, the image processing unit 200 synthesizes the synthesized image obtained by the previous synthesis processing with an input image $I_C$ and creates a new synthesized image. The processing at S910 also corresponds to the operation in the image synthesizing unit 204. At this time, the synthesized image obtained by the previous synthesis processing is written back in the image holding unit 202 through the data line 3, and this synthesized image and the input image $I_C$ are outputted to the image synthesizing unit 204 again through the data lines 1 and 2 to perform synthesis processing. At this time, too, the synthesis is possible by using the formula (2). When the synthesized image (image obtained by synthesizing the input images $I_1, I_2, \ldots I_{C-1}$) obtained by the previous synthesis processing and the input image $I_C$ are synthesized, it is only necessary to set $T_L=T_C$, $T_S=T_{C-1}$, the pixel value of the image obtained by synthesizing the input images $I_1, I_2, \ldots I_{C-1}$ to $I_S$, and the pixel value of the input image $I_C$ to $I_L$.

At S912, the image processing unit 200 increments a loop counter C (increases the value of C by one). At S914, it is determined whether the value of the loop counter C exceeds the number m of the input images or not, and while this determination is negative, the processing from S910 to S914 is repeatedly executed, and all the input images are synthesized.

As also described above, if the digital camera 100 is held by hand or the subject is a moving body, the images on the two input images might be shifted from each other. In that case, in the image synthesis processing at S904 and S910, the image processing unit 200 preferably executes processing of cutting-out, pasting and the like of images by using a pattern matching technology so that the synthesized images do not fail.

The processing from S904 to S914 described above will be specifically explained by using an example in which the number m of the input images is 4. It is assumed that input images $I_1, I_2, I_3$, and $I_4$ are obtained and temporarily stored in the image holding unit 202. At S904, the input image $I_1$ and the input image $I_2$ are outputted from the image holding unit 202 to the image synthesizing unit 204 through the data line 1 and the data line 2, respectively, and the synthesized image (this image shall be referred to as a synthesized image $I_{12}$) is created. Since it is m=4, the determination at S906 is positive, and after the processing at S908 is executed, the processing at S910 is executed.

At S910, synthesized image $I_{12}$ is written back in the image holding unit 202 from the image synthesizing unit 204 through the data line 3. Subsequently, the synthesized image $I_{12}$ and the input image $I_3$ are outputted to the image synthesizing unit 204 through the data line 1 and the data line 2, respectively, and a synthesized image (this image will be referred to as a synthesized image $I_{123}$) is created.

At S912, the loop counter C is incremented to 4. That is, since C=m, the determination at S914 is negative, thus the processing at S910 is executed again. At this time, the synthesized image $I_{123}$ is written back in the image holding unit 202 from the image synthesizing unit 204 through the data line 3. Subsequently, the synthesized image $I_{123}$ and an input image 14 are outputted to the image synthesizing unit 204 through the data line 1 and the data line 2, respectively, and a synthesized image (this image will be referred to as a synthesized image $I_{1234}$) is created.

At S912, the loop counter C is incremented to 5. As a result, the determination at S914 becomes positive, and the processing proceeds to S916. That is, by synthesizing the four input images $I_1$, $I_2$, $I_3$, and $I_4$, a synthesized image $I_{1234}$ is obtained in the end. While the processing from S904 to S914 above is executed, the display device 110 and the like may display a resized image in the middle of the synthesis process or may display notification that the image is now undergoing synthesis processing to the photographer and the like.

The processing at S916 and after will be described. The image processing unit 200 develops, at S916, the synthesized image created by the processing from S904 to S914 and applies processing of white balance, color hues, color intensity, contrast, unsharp mask and the like to create an image for recording.

At S918, the image processing unit 200 creates a post-view image on the basis of the recorded image obtained by the processing at S916 and displays it on the display device 110 and the like. At S920, the image processing unit 200 executes processing of compressing the image for recording and records it in the image recording unit 240. The processing from S916 to S920 above corresponds to the processing in the recorded image creating unit 208. The compression processing at S920 is not indispensable and uncompressed images for recording may be recorded in the image recording unit 240. Moreover, the synthesized image before being subjected to the development processing at S916 may be recorded in the image recording unit 240 as a so-called RAW image. At this time, the RAW image may be recorded separately or may be recorded along with the recorded image created at S916 and compressed at S920.

As described above, by the digital camera 100 according to this embodiment, a recorded image whose gradation can be reproduced in accordance with a wider brightness region of the subject can be obtained. In addition, a live-view image whose dynamic range is expanded on the basis of the plurality of input images with different exposures can be displayed. Therefore, by observing the live-view image, the photographer can expect a finished state of an image which will be obtained by actually photographing. Thus, exposure correction and the like can be made more accurately in compliance with design intensions.

The number n of the input images with different exposures obtained in the live-view display operation is smaller than the number m of the input images with different exposures obtained in the still image recording operation. As a result, display of the live-view image or responsiveness of the automatic focusing can be maintained. Moreover, while the number n is fixed to 2 (n=2), as described by referring to FIG. 8, creation of one live-view image from the input image obtained at the latest timing (the long exposure image or the short exposure image) and the input image obtained at the timing immediately before the latest timing (the short exposure image or the long exposure image) is repeated in a state in which the short exposure image and the long exposure image are obtained alternately. As a result, follow-up performances equal to the prior-art live-view image can be obtained.

That is, it is not necessary to wait for obtainment of two input images with short exposure and long exposure before one live-view image is created through the synthesis processing. Synthesis of the short exposure image and the long exposure image is repeated by a so-called interleaving method so as to create a live-view image. That is, the latest input image and the input image obtained at the timing immediately before the latest timing are synthesized, such as the short exposure image+long exposure image and the long exposure image+short exposure image, so that the live-view image is created. In this way, display of the live-view image can be updated at a frame rate equal to the image pickup frame rate in the image pickup unit 220 without considerably increasing the processing capability (scale of the hardware) of the image processing unit 200.

—Second Embodiment—

In the first embodiment described above, the image pickup unit 220 is operating in the monitoring mode during the live-view operation and pixel addition or pixel thinning is performed in the image pickup element 102 at that time, and the number of pixels of the input image is decreased. On the other hand, in the second embodiment, the pixel addition or pixel thinning is not performed in the image pickup element even during the live-view display operation to obtain an input image.

Figure 10:
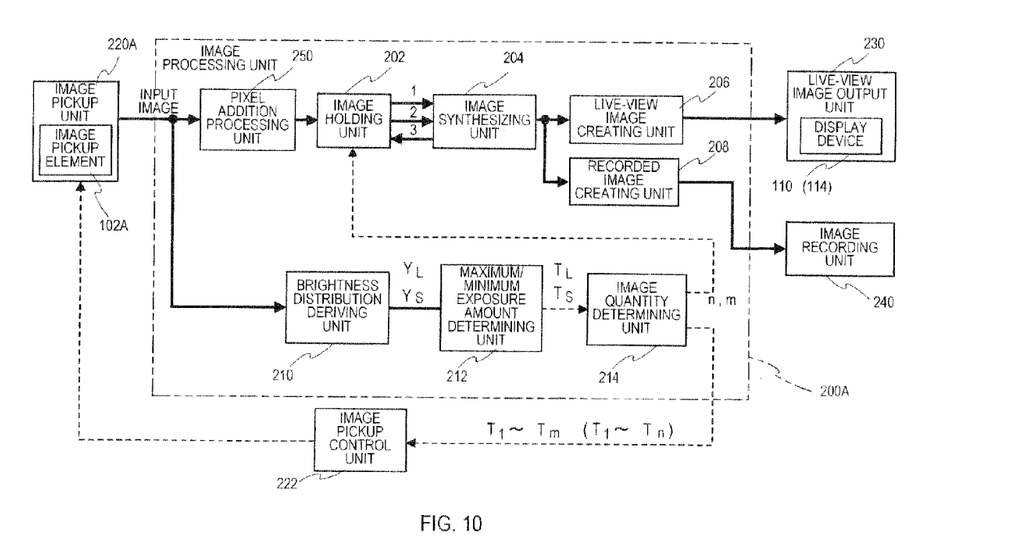
FIG. 10 is a block diagram for explaining an internal configuration of a digital camera according to a second embodiment.

FIG. 10 is a block diagram for roughly explaining an internal configuration of the digital camera according to the second embodiment. In FIG. 10, the constituent elements similar to those illustrated in FIG. 2 are given the same reference numerals and the description thereof will be omitted, and differences from the first embodiment will be mainly described.

An image pickup unit 220A is different from the image pickup unit 220 in the first embodiment in a point that an image pickup element 102A is provided. The image pickup element 102A can read out a signal without pixel addition or pixel thinning even during the live-view display operation. As the image pickup element 102A, an image pickup element having a relatively small number of pixels or an image pickup element whose transfer speed of the signal to the image processing unit 200A is relatively high is used, for example. As a result, the digital camera of the second embodiment can be put into practice. The digital camera according to the second embodiment will be referred to as a digital camera 100A.

The image processing unit 200A includes a pixel addition processing unit 250 in addition to all the constituent elements in the image processing unit 200 in the first embodiment. The image pickup unit 220A and the pixel addition processing unit 250 as well as the pixel addition processing unit 250 and the image holding unit 202 are connected by the data lines. The pixel addition processing unit 250 may be composed of a logical circuit such as ASIC, FPGA and the like. Alternatively, the pixel addition processing unit 250 may be composed of a CPU/DSP (central processing unit/digital signal processor) executing an addition calculation program and the like.

The pixel addition processing unit 250 decreases the number of pixels by applying processing of pixel addition to an input image having a relatively high pixel value sequentially obtained from the image pickup unit 220A while the digital camera 100A is performing the live-view display operation. As a result, a processing load when the image is synthesized in the image synthesizing unit 204 can be made equal to that of the image synthesizing unit 204 in the first embodiment. On the other hand, the pixel addition processing unit 250 outputs and stores the input image obtained from the image pickup unit 220A in the image holding unit 202 without applying the pixel addition processing thereto during the still image recording operation.

In FIG. 10, an example in which the image pickup unit 220A and the brightness distribution deriving unit 210 are connected by a data line similarly to those illustrated in FIG. 2 is illustrated. Instead of this, the output side of the pixel addition processing unit 250 and the brightness distribution deriving unit 210 may be connected by the data line and the input image whose number of pixels is decreased may be inputted to the brightness distribution deriving unit 210.

Other than those described above, the live-view display operation and the still image recording operation performed by the digital camera 100A are similar to the digital camera 100 in the first embodiment, and thus, the description will be omitted.

According to the second embodiment, during the live-view display operation, a live-view image can be created by synthesizing input images with the numbers of pixels not depending on the hardware configuration of the image pickup element 102A. In general, in the case of thinned reading-out or pixel addition reading-out on the image pickup element side, the image size that can be read out (read-out pixel number) depends on the hardware configuration (specification) of the image pickup element. In this regard, according to the second embodiment, the input image with a value of pixels higher than that obtained from the image pickup unit 220A is subjected to pixel addition in the pixel addition processing unit 250. Therefore, the number of pixels of the input image can be changed in various ways by changing the pixel adding method in the pixel addition processing unit 250.

The image pickup apparatus described in the first and second embodiments is not, limited to a digital still camera but may be a movie camera capable of recording a still image. Moreover, the image pickup apparatus may be a camera incorporated in a mobile phone, PDA, a portable computer and the like. Moreover, the image pickup apparatus may be a photographing device for a microscope or a device for recording an endoscopic image.

The description of the above-described first and second embodiments is based on processing by hardware as image processing executed by an image processing unit of an image pickup apparatus (a camera, a mobile phone, a portable computer and the like), but this configuration is not limiting. For example, configuration of processing by separate software is also possible. In this case, the image processing unit corresponds to a computer and includes a CPU, a main storage device such as a RAM and the like for storing image data, and a computer-readable recording device (or non-transitory recording medium) storing a program for realizing the whole of or a part of the above image processing, for example. Here, this program is called an image processing program. When the CPU reads out the image processing program stored in the above recording device and executes working/arithmetic processing of the image data, the processing similar to the above-described image processing unit is realized.

Here, the computer-readable recording device (or a non-temporary recording medium) refers to a magnetic disk, a magnetoptical disk, a CD-ROM, a DVD-ROOM, a semiconductor memory and the like. Moreover, this image processing program may be delivered to a computer via a communication line, and the computer having received this delivery may execute the image processing program.

It is obvious that the present invention is not limited by the above embodiment but capable of various changes within a range of the technical scope thereof.

This application claims for priority on the basis of Japanese Patent Application No. 2011-85238 filed on Apr. 7, 2011 and incorporates the whole of the application herein by reference.

What is claimed is:

1. An image pickup apparatus comprising:
    an image pickup unit configured to obtain a set of plural input images with different exposure amounts by photographing a same subject;
    an image synthesizing unit which creates a synthesized image from the set of plural input images with the different exposure amounts;
    a live-view image output unit which outputs a live-view image based on the synthesized image created by synthesizing a set of n (where n is an integer not less than 2) input images with different exposure amounts obtained from the image pickup unit in the image synthesizing unit during a live-view display operation; and
    a recorded image creating unit which creates an image for recording based on the synthesized image synthesized in the image synthesizing unit and created by synthesizing a set of m (where m is an integer not less than 2 and larger than n) input images with different exposure amounts obtained from the image pickup unit during main photographing.

2. The image pickup apparatus according to claim 1, wherein:
    the image pickup unit is configured to perform pixel addition read-out; and
    the live-view image output unit outputs the live-view image based on a synthesized image created by synthesizing the set of n pieces of input images obtained by the image pickup unit by using the pixel addition read-out.

3. The image pickup apparatus according to claim 1, further comprising:
    a pixel addition processing unit which applies pixel addition processing to the input image obtained from the image pickup unit, and which decreases a number of pixels,
    wherein the live-view image output unit outputs the live-view image based on a synthesized image created by synthesizing in the image synthesizing unit after the pixel addition processing unit decreases the number of pixels for each of the set of n pieces of input images with different exposure amounts obtained from the image pickup unit during the live-view display operation.

4. The image pickup apparatus according to claim 1, further comprising:
    an image quantity determining unit which determines the number m of the plurality of input images to be obtained from the image pickup unit in the main photographing based on the set of n pieces of input images obtained from the image pickup unit during the live-view display operation.

5. The image pickup apparatus according to claim 4, wherein:
the image quantity determining unit further determines a new number of input images to be obtained by the image pickup unit in the live-view display operation to be performed at a subsequent timing based on the set of n pieces of input images obtained from the image pickup unit during the live-view display operation.

6. The image pickup apparatus according to claim 1, further comprising:
a brightness distribution deriving unit which derives data for evaluation for evaluating a brightness distribution of the subject in correspondence with each of the n pieces of input images obtained from the image pickup unit during the live-view display operation; and
a maximum/minimum exposure amount determining unit which evaluates the data for evaluation and determines a maximum exposure amount and a minimum exposure amount among exposure amounts to be set when the set of plural input images with different exposure amounts are obtained by photographing the same subject in the image pickup unit in the main photographing based on the evaluation result.

7. The image pickup apparatus according to claim 6, wherein:
the brightness distribution deriving unit creates brightness image data composed of a number of pixels smaller than the number of pixels of each of the n pieces of input images as the data for evaluation, in correspondence with each of the n pieces of input images obtained from the image pickup unit during the live-view display operation.

8. The image pickup apparatus according to claim 6, wherein:
the maximum/minimum exposure amount determining unit determines the minimum exposure amount based on the evaluation result of the data for evaluation created in correspondence with the input image obtained with a smallest exposure amount and determines the maximum exposure amount based on the evaluation result of the data for evaluation created in correspondence with the input image obtained with a largest exposure amount among the data for evaluation.

9. The image pickup apparatus according to claim 6, wherein:
the maximum/minimum exposure amount determining unit determines the minimum exposure amount so that a rate occupied by a region having brightness at a first threshold value or more becomes a second threshold value or less in the data for evaluation derived in correspondence with the input image obtained with a smallest exposure amount, among the data for evaluation.

10. The image pickup apparatus according to claim 6, wherein:
the maximum/minimum exposure amount determining unit determines the maximum exposure amount so that a rate occupied by a region having brightness at a third threshold value or less becomes a fourth threshold value or less in the data for evaluation derived in correspondence with the input image obtained with a largest exposure amount, among the data for evaluation.

11. The image pickup apparatus according to claim 1, wherein the value of n is fixed to 2.

12. The image pickup apparatus according to claim 1, wherein the live-view image output unit includes a display device configured to display the live-view image.

13. An image pickup method comprising:
obtaining a set of plural input images with different exposure amounts by photographing a same subject;
creating a synthesized image from the set of plural input images with different exposure amounts;
outputting a live-view image based on the synthesized image created by synthesizing a set of n pieces (where n is an integer not less than 2) of input images with different exposure amounts obtained by photographing during a live-view display operation; and
creating an image for recording based on the synthesized image created by synthesizing a set of m pieces (where m is an integer not less than 2 and larger than n) of input images with different exposure amounts obtained by photographing in main photographing.

14. A non-transitory computer-readable recording medium having stored thereon an image processing program for controlling a computer to execute a method comprising:
obtaining a set of plural input images with different exposure amounts by photographing a same subject;
creating a synthesized image from the set of plural input images with different exposure amounts;
outputting a live-view image based on the synthesized image created by synthesizing a set of n pieces (where n is an integer not less than 2) of input images with different exposure amounts obtained by photographing during the a live-view display operation; and
creating an image for recording based on the synthesized image created by synthesizing a set of m pieces (where m is an integer not less than 2 and larger than n) of input images with different exposure amounts obtained by photographing in main photographing.

* * * * *